UNITED STATES PATENT OFFICE.

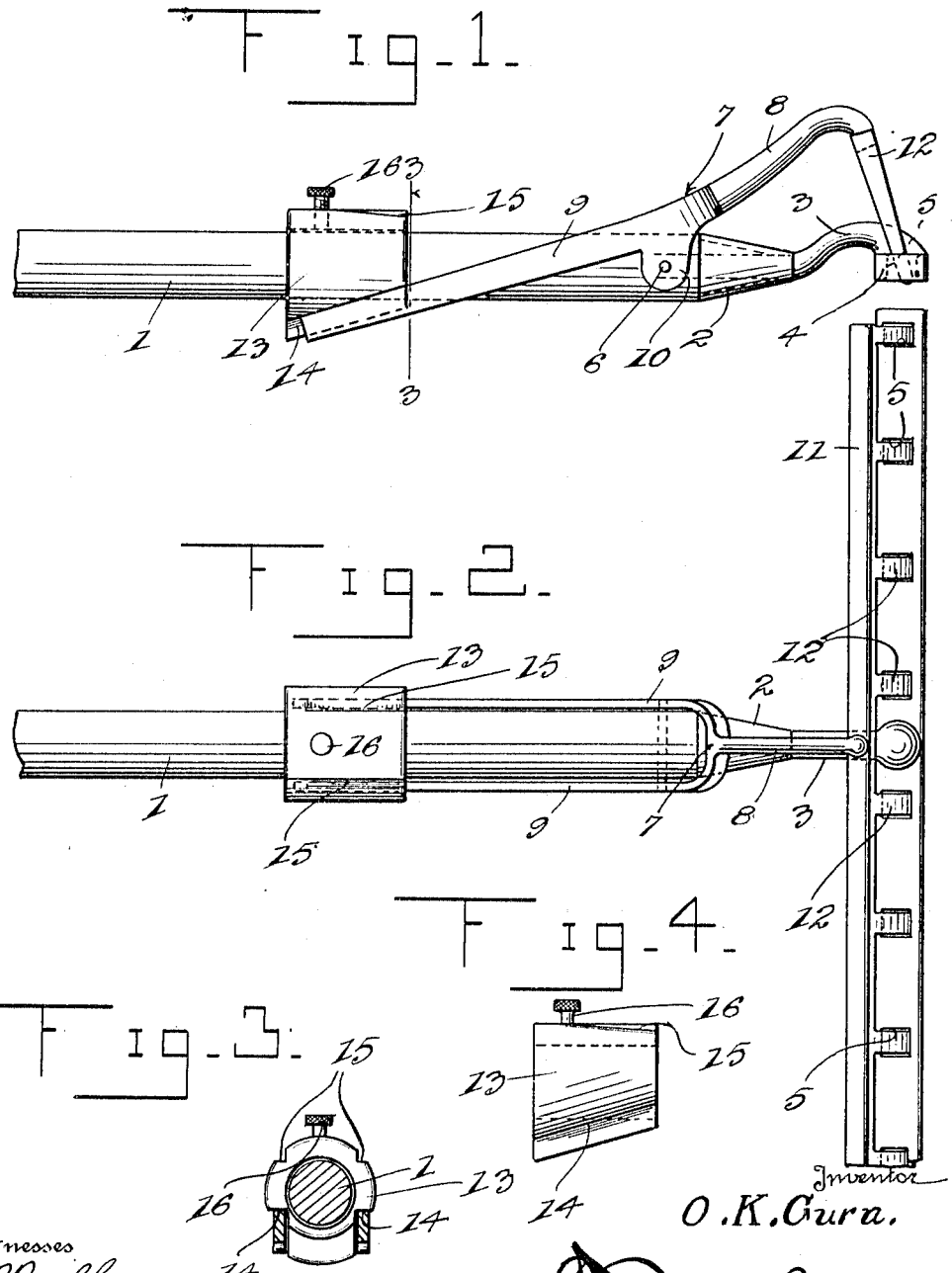

OTTO K. GURA, OF BRIDGEPORT, CONNECTICUT.

RAKE.

1,118,548.  Specification of Letters Patent.  Patented Nov. 24, 1914.

Application filed December 23, 1913. Serial No. 808,427.

*To all whom it may concern:*

Be it known that I, OTTO K. GURA, a citizen of the United States, residing at Bridgeport, in the county of Fairfield and State of Connecticut, have invented certain new and useful Improvements in Rakes; and I do hereby declare the following to be a full, clear, and exact description of the invention, such as will enable others skilled in the art to which it appertains to make and use the same.

This invention relates to new and useful improvements in rakes, and has for its principal object to provide a device wherein the rake teeth may be guarded in such a way as to prevent accident.

A further object of the invention is to provide a means to lock the teeth in their guarded position when the rake is not in use, and thereby prevent danger of injury which usually accompanies the use of ordinary types of rake.

A still further object of the invention is to provide a novel combination and arrangement of parts by means of which the above result may be accomplished and also to provide a device which may be simple in construction and easily operated.

With the above and other objects in view, the invention consists in the combination and arrangement of parts which will be fully set forth in the following specification and accompanying drawings, in which—

Figure 1 is a side view of the rake constructed in accordance with this invention, Fig. 2 is a top plan view of Fig. 1, Fig. 3 is a transverse sectional view taken on line 3—3 of Fig. 1 and looking in the direction of the arrow, and Fig. 4 is a side view of the locking means.

Referring now to the drawings by characters of reference, the numeral 1 designates a rake handle having secured thereto at one end the ferrule 2. This ferrule 2 is provided with an aperture at its reduced end as clearly illustrated in Fig. 1 to which the stem 3 is connected, said stem being formed integrally with a stripper bar 4. Thus it will be seen that the stripping bar 4 is held rigidly to the rake handle. A plurality of spaced apertures 5 are formed in the stripping bar as clearly shown in Fig. 2 and are shaped to conform to the structure of the rake teeth, which will be more fully hereinafter described.

Pivotally secured to the rake handle 1 as at 6, is preferably provided the teeth carrying element which is designated generally by the numeral 7. This element 7 comprises the stem 8 which terminates at one end in the U-shaped member 9, the arms of which are provided at the bight portion with the depending ears 10, which ears are provided with apertures, by means of which the element 7 is pivotally secured to the handle as previously described. Formed integral with the end of the stem 8 opposite the U-shaped member is preferably provided the transverse bar 11 having formed integral therewith and extending angularly therefrom, a plurality of rake teeth 12 which extend through the apertures 5 in the stripping bar 4, as clearly shown in Figs. 1 and 2. The arms 9 of the U-shaped member as clearly shown in Figs. 1 and 2, are so arranged that they straddle the handle 1 and the free terminals of said arms are adapted to be engaged by the slidable collar 13, which is provided with two sets of oppositely disposed grooves 14 and 15 respectively. Each set of grooves is so arranged that when the collar is slid toward the ferrule 2 the said grooves will come into contact with the ends of the arms of the U-shaped member 9 and lock the bar 11 carrying the rake teeth 12, in either its upper or lower position, as will be clearly seen upon referring to the drawings. A suitable set screw 16 is threaded into the collar intermediate its ends and between the grooves 15 and is so arranged as to frictionally engage the handle 1 to hold the collar in its adjusted position thereon.

It will be clearly seen from the foregoing, that when it is desired to make use of the device, the collar 13 is loosened and slid toward the upper end of the handle, the member 7 is then rocked to the desired position and the collar slid in place, thus bringing either set of notches 14 or 15 into engagement with the U-shaped member 9 and thus holding the rake teeth in the position desired by the user. Should it be desired to place the device in condition for raking, it will be evident that the notches 15 will be put into use, whereas if it is desired that the teeth be locked in their guarded position, it will be evident that the notches 14 will engage the U-shaped member, and thus hold the teeth in the position illustrated in Fig. 1.

While in the foregoing I have shown and described the preferred embodiment of my invention, I wish it to be understood that I may make such changes in the combination and arrangement of parts as will fall within the scope of the claims appended hereto.

Having thus described my invention, I claim:

1. In a device of the character described, a handle, a stripping bar rigidly secured to said handle, said stripping bar having a plurality of apertures therein, a U-shaped member pivotally secured to the handle near the end carrying the stripping bar, a transverse bar formed on the U-shaped member, teeth carried by the transverse bar and extending through the apertures in the stripping bar, said U-shaped member being adapted to straddle the handle, a sleeve slidable on the handle, said sleeve being adapted to engage the free ends of the arms of the U-shaped member and hold the same in their adjusted position.

2. A device of the character described comprising a handle, an apertured stripping bar secured to the handle at one end, a U-shaped member pivotally secured to the handle, near the end carrying the stripping bar, an extension formed on the U-shaped member and projecting forwardly therefrom, a transverse teeth carrying bar formed integral with the forward extension, teeth formed on the teeth carrying bar and extending through the apertures in the stripping bar, the arms of the U-shaped member extending rearwardly and straddling the handle, a sleeve slidable on the handle, a set screw to adjustably secure the sleeve in the desired position, said sleeve being adapted to receive the free end of the U-shaped member and hold the rake teeth in the desired position.

In testimony whereof I affix my signature in presence of two witnesses.

OTTO K. GURA.

Witnesses:
  CLARK HOYT CUMMINGS,
  JAMES WILSON.

Copies of this patent may be obtained for five cents each, by addressing the "Commissioner of Patents, Washington, D. C."